(12) United States Patent
Tanaka et al.

(10) Patent No.: US 7,799,378 B2
(45) Date of Patent: Sep. 21, 2010

(54) PROCESS FOR PRODUCING MICROPILLAR STRUCTURE

(75) Inventors: Masaru Tanaka, Sapporo (JP);
Masatsugu Shimomura, Sapporo (JP);
Masafumi Takebayashi, Sapporo (JP);
Hiroshi Yabu, Sapporo (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 893 days.

(21) Appl. No.: 10/536,589

(22) PCT Filed: Nov. 27, 2003

(86) PCT No.: PCT/JP03/15171

§ 371 (c)(1),
(2), (4) Date: May 26, 2005

(87) PCT Pub. No.: WO2004/048064

PCT Pub. Date: Jun. 10, 2004

(65) Prior Publication Data

US 2006/0097361 A1    May 11, 2006

(30) Foreign Application Priority Data

Nov. 27, 2002  (JP) .............................. 2002-344513
Oct. 16, 2003  (JP) .............................. 2003-356881

(51) Int. Cl.
*B05D 5/00*  (2006.01)
*B05D 7/24*  (2006.01)
*B05D 3/10*  (2006.01)
*B05D 3/12*  (2006.01)
*B29C 41/12* (2006.01)
*B29C 41/36* (2006.01)
*B29D 28/00* (2006.01)
*C12M 3/00*  (2006.01)
*C08J 9/00*  (2006.01)

(52) U.S. Cl. .................... 427/271; 427/407.1; 427/335; 427/355; 427/377

(58) Field of Classification Search .............. 427/407.1, 427/271, 335, 355, 377
See application file for complete search history.

(56) References Cited

U.S. PATENT DOCUMENTS

| 3,354,022 A | 11/1967 | Dettre et al. |
| 6,291,050 B1 * | 9/2001 | Cree et al. .................. 428/131 |
| 6,764,745 B1 | 7/2004 | Karasawa et al. |

FOREIGN PATENT DOCUMENTS

| EP | 0760840 | 2/2001 |
| EP | 1247636 | 10/2002 |
| JP | 9-155972 | 6/1997 |
| JP | 9-239829 | 9/1997 |
| JP | 10-108905 | 4/1998 |
| JP | 2001-157574 | 6/2001 |
| JP | 2002-335949 | 11/2002 |
| JP | 2002335949 | * 11/2002 |
| JP | 2002-347107 | 12/2002 |
| JP | 2003-128832 | 5/2003 |
| JP | 2003-253020 | 9/2003 |
| JP | 2003-305361 | 10/2003 |
| WO | 95/32258 | 11/1995 |
| WO | 00/20210 | 4/2000 |
| WO | 00/50232 | 8/2000 |

OTHER PUBLICATIONS

Machine translation of JP 2001-157574, generated Feb. 4, 2008.*
Widawski et al., "Self-organized honeycomb morphology of star-polymer polystyrene films," Nature, vol. 369, Jun. 2, 1994, pp. 387-389.*

* cited by examiner

*Primary Examiner*—William Phillip Fletcher, III
(74) *Attorney, Agent, or Firm*—patenttm.us

(57) ABSTRACT

A solution having a polymer dissolved in a hydrophobic organic solvent is cast on a substrate, said organic solvent is evaporated in a moist atmosphere to condense moisture contained in an atmosphere prevailing on a surface of said cast solution into micro-droplets, said micro-droplets are dispersed on the surface of said cast solution or in said cast solution into a close-packed structure, said micro-droplets, condensed and dispersed on the surface of said cast solution or in said cast solution, are evaporated to obtain a porous honeycomb structure with said droplets used as casts, and said porous honeycomb structure is at least bisected by peeling in a thickness direction, thereby obtaining honeycomb structures wherein micro-pillars or anisotropic micro-pillars are regularly formed and arranged by said bisection on the peeled sections.

9 Claims, 10 Drawing Sheets (a)

(b)

(c)

PROCESS FOR PRODUCING MICROPILLAR STRUCTURE

ART FIELD

The present invention relates generally to a micro-pillar structure having quite a unique surface state, and particularly to a porous thin-film structure wherein ultramicro-pillars are regularly arranged on a substrate surface at a given spacing and its preparation process. More particularly, the invention concerns a porous thin-film structure having a water-repellent or hydrophilic surface, wherein ultramicro-pillars are regularly arranged on a substrate surface. The inventive structures, because of their own surface shape specificity, are all expected to have ever better advantages over structures that are free of micro-pillars or have irregular pillars. All things considered, the invention pertains to a micro-pillar structure that is applicable or usable not only as cell culture engineering materials and medical scaffolding materials but also as semiconductors, recording materials, screens, separators, ion exchange membranes, battery separator materials, displays, optical materials, optical guides, acoustic equipment materials or the like in various technical fields.

BACKGROUND OF THE INVENTION

Mainly in the field of biochemistry, substrates with micropores or the like regularly formed and arranged on their surfaces have recently been incessantly proposed and made public as scaffolding materials in cell engineering and culture engineering in scientific literature and articles.

Applications of each of the substrates proposed so far in the art to various art fields, to say nothing of medical fields, are now under study. For instance, their applications to a diversity of fields including semiconductors, low-dielectric-constant materials, scatter layers for electronic displays, magnetic recording material, photonic crystals and cell culture substrates are now under study. Thus, such substrates attract attention as one of promising materials.

However, attempts to prepare structures with such micropoores regularly arranged thereon by means of ordinary micromachining processes run across such problems as mentioned below, and it is very difficult to achieve them; such micromachining processes are still far away from practically proper means. For instance, the micro-machining processes include lithography and laser machining. With these processes, however, there are some limits to the materials to be machined. In addition, an almost unlimitedly extraordinary number of micropores must be formed with regularity in mind, and so by very troublesome operations. It is not hard to imagine that micromachining requires a lot of steps and much time even though it is carried out by those pretty skilled in the art. As a matter of course, micromachining costs much.

Apart from this, there is known a so-called phase separation process by which micropatterns are formed. However, the resulting surface state involves a reproducibility problem; only an inhomogeneous pattern is obtainable. Thus, that phase separation process is still less than satisfactory for the formation of micropatterns having specific regularity.

Anyway, all the prior surface processing methods relying upon micropatterning technology require ever higher levels of techniques, and so have a lot of problems such as the inability to achieve mass production, and unavoidably increased costs.

By the way, some recent literature has reported that regular micropatterns are relatively easily formed by casting a dilute polymer solution on a solid substrate. One typical process has been proposed by a researcher group including the present inventors (see non-patent publication 1). According to this process, a dilute polymer solution is cast, and the solvent is evaporated thereby forming a dot (pillar, protuberance, or projection) pattern of microstructure in the polymer. Even that process is unsatisfactory, because it is still difficult to obtain any microdot pattern with such regularity as to control a dot array.

It has also been proposed to form a porous film having a micro-honeycomb pattern as a microstructure (non-patent publications 2 and 3). In this process wherein a special polymer having a moiety of strong self-aggregation force and a flexibility-developing moiety in combination is used, that polymer is dissolved in a hydrophobic organic solution, and the solution is then cast thereby forming said pattern.

The group including the present inventors has made an intensive study of this process as well, and succeeded in preparing a microstructure having a unique honeycomb structure by choice of a specific polymer. The results have been reported in articles (non-patent publications 4 and 5).

That is, the inventors have succeeded in the formation of a porous thin film having a honeycomb pattern structure by using as the constituent of said polymer an amphiphilic polymer comprising a hydrophilic acrylamide polymer as a main chain and having a dodecyl group as a hydrophobic side chain and a lactose or carboxyl group as a hydrophilic side chain or an ionic complex of an anionic polysaccharide such as heparin or dextran sulfate with a quaternary long-chain alkyl-ammonium salt.

The inventors have also found that porous honeycomb structure films prepared from various biodegradable polymers provide an especially promising material for cell culture substrates, and filed a patent application for them (patent publication 1).

The preparation process proposed by the inventors in that patent application involves an extremely simplified operation wherein a porous honeycomb structure film is obtainable by blowing a high-humidity air onto a cast film of a hydrophobic organic solution having a controlled concentration or the cast film is placed in a high-humidity atmosphere, and so is favorable in terms of preparation cost.

In that case, the pore diameter of the porous film can be controlled in the range of 0.1 to 100 µm by changing the diameter of water droplets acting as pore casts. Thus, the proposal by the inventors is of great originality and excellence.

Non-Patent Publication 1
Chemistry Letters, 821, 1996
Non-Patent Publication 2
Science 283, 373, 1999
Non-Patent Publication 3
Nature 369, 387, 1994
Non-Patent Publication 4
Thin Solid Films 327, 829, 1998
Non-Patent Publication 5
Molecular Cryst. Liq. Cryst. 322, 305, 1998
Patent Publication 1
JP(A) 200-1157574

The studies and proposals mentioned above underlie the present invention. One object of the invention is to achieve a further extension of them so that a structure that has not just a honeycomb texture but also with micro-pillars formed on its surface can be obtained by means of an extremely simplified process.

Another object of the invention is to provide, through a very simplified process, a micro-pillar structure with anisotropy imparted thereto, a micro-pillar structure enriched in water repellency, and a micro-pillar structure enriched in hydrophilicity.

DISCLOSURE OF THE INVENTION

As a result of intensive studies of the technology mentioned above and a further extension thereof, the inventors have now succeeded in obtaining a structure that has quite an unheard-of surface properties, i.e., an regular array of micro-pillars. That is, the inventors have succeeded in the preparation of a structure having absolutely unique micro-pillars by starting from a solution of a polymer in a hydrophobic organic solvent to obtain a porous thin film of honeycomb structure as an intermediate, and bisecting the intermediate by peeling in its thickness direction.

Having been made on the basis of this success and findings obtained along the way, the present invention is embodied as follows.

(1) A micro-pillar structure, characterized in that micro-pillars are regularly arranged on a substrate surface.

(2) A micro-pillar structure having a water-repellent surface, characterized in that micro-pillars are regularly arranged on a substrate surface, and have water repellency.

(3) A micro-pillar structure having a hydrophilic surface, characterized in that micro-pillars are regularly arranged on a substrate surface, and are made hydrophilic by a hydrophilicity-imparting treatment.

(4) A micro-pillar structure according to any one of (1) to (3) above, wherein said substrate and said micro-pillars comprise a polymer and, if required, includes a modifier.

(5) A micro-pillar structure according to any one of (1) to (4) above, wherein said substrate and said micro-pillars use as a precursor a porous honeycomb structure comprising a polymer and, if required, including a modifier, and said structure is obtained by bisecting said precursor by peeling in a thickness direction.

(6) A micro-pillar structure according to (5) above, wherein said precursor or the substrate obtained from said precursor is in a thin-film form.

(7) A micro-pillar structure according to any one of (1) to (5) above, wherein said micro-pillars are arranged at a length of 0.1 to 50 μm, a tip length of 0.01 to 20 μm and a spacing of 0.1 to 100 μm.

(8) A micro-pillar structure according to claim 4 or 5, wherein said polymer includes a hydrophobic or biodegradable polymer, and includes an amphiphilic polymer.

(9) A micro-pillar structure according to (8) above, wherein said polymer comprises 50 to 99% of said hydrophobic polymer and/or said biodegradable polymer with the rest being said amphiphilic polymer.

(10) A micro-pillar structure according to (8) or (9) above, wherein a polyester, a poly(meth)acrylate, a polycarbonate or a polystyrene is used as said hydrophobic or biodegradable polymer.

(11) A micro-pillar structure according to any one of (1) to (10) above, characterized in that a solution having a polymer dissolved in a hydrophobic organic solvent is cast on a substrate, said organic solvent is evaporated in a moist atmosphere to condense moisture contained in an atmosphere prevailing on a surface of said cast solution into micro-droplets, said micro-droplets are dispersed on the surface of said cast solution or in said cast solution into a close-packed structure, said micro-droplets, condensed and dispersed on the surface of said cast solution or in said cast solution, are evaporated to obtain a porous honeycomb structure with said droplets used as casts, and said porous honeycomb structure is at least bisected by peeling in a thickness direction, thereby obtaining honeycomb structures wherein micro-pillars are regularly formed and arranged by said bisection on peeled sections.

(12) A micro-pillar structure according to any one of (1) to (11) above, characterized in that said micro-pillars are oriented in any direction except for a vertical direction and set with anisotropy.

(13) A micro-pillar structure according to (12) above, characterized in that said anisotropic micro-pillars are obtained by a peeling treatment including transverse shearing stress in such a way that when the porous honeycomb structure that is a micro-pillar precursor is sectioned by peeling in the thickness direction, the resulting micro-pillars are oriented in any direction except for the vertical direction.

(14) A micro-pillar structure according to (3) above, wherein said hydrophilicity-imparting treatment is any one or a combination of a chemical modification treatment, an ozone oxidization treatment and an alkali treatment.

(15) A process for preparing a micro-pillar structure, characterized in that a solution having a polymer dissolved in a hydrophobic organic solvent is cast on a substrate, said organic solvent is evaporated in a moist atmosphere to condense moisture contained in an atmosphere prevailing on a surface of said cast solution into micro-droplets, said micro-droplets are dispersed on the surface of said cast solution or in said cast solution into a close-packed structure, said micro-droplets, condensed and dispersed on the surface of said cast solution or in said cast solution, are evaporated to obtain a porous honeycomb structure with said droplets used as casts, and said porous honeycomb structure is at least bisected by peeling in a thickness direction, thereby obtaining honeycomb structures wherein micro-pillars are regularly formed and arranged by said bisection on peeled sections.

(16) A process for preparing a micro-pillar structure according to (15) above, characterized in that said polymer is composed of a hydrophobic or biodegradable polymer and an amphiphilic polymer and, if required, a modifier is incorporated therein.

(17) A process for preparing a micro-pillar structure according to (16) above, wherein said polymer comprises 50 to 99% of said hydrophobic polymer or said biodegradable polymer with the rest being said amphiphilic polymer.

(18) A process for preparing a micro-pillar structure according to (16) or (17) above, characterized in that said hydrophobic or biodegradable polymer comprises a polymer having a polyester, a poly(meth)acrylate, a polycarbonate or a polystyrene as a basic skeleton.

(19) A process for preparing a micro-pillar structure according to (15) above, wherein said moist atmosphere is adjusted to a relative humidity of 50 to 95%.

(20) A process for preparing a micro-pillar structure according to (15) or (19) above, characterized in that said atmosphere is an ordinary air atmosphere.

(21) A process for preparing a micro-pillar structure according to (15) above, characterized in that operation for evaporation of said organic solvent in said moist atmosphere is carried out by blowing an atmosphere having a high humidity onto an evaporation interface of said organic solvent.

(22) A process for preparing a micro-pillar structure according to (15) above, characterized in that peeling operation is carried out by use of an adhesive tape.

(23) A process for preparing a micro-pillar structure according to (15) above, characterized in that peeling operation is carried out by dissolution of the polymer.

(24) A process for preparing a micro-pillar structure according to (15) above, characterized in that peeling operation is carried out by ultrasonic irradiation.

(25) A process for preparing a micro-pillar structure according to any one of (15) to (24) above, characterized in that said micro-pillars are arranged at a length of 0.1 to 50 µm, a tip length of 0.01 to 20 µm and a spacing of 0.1 to 100 µm.

(26) A process for preparing a micro-pillar structure according to any one of (15) to (25) above, wherein said micro-pillars are oriented in any direction except for a vertical direction and set with anisotropy.

(27) A process for preparing a micro-pillar structure according to (26) above, characterized in that said anisotropic micro-pillars are obtained by a peeling treatment with transverse shearing stress in such a way that when the porous honeycomb structure that is a micro-pillar precursor is sectioned by peeling in the thickness direction, the resulting micro-pillars are oriented in any direction except for the vertical direction.

ADVANTAGES OF THE INVENTION

The present invention provides quite an unheard-of material by casting a dilute polymer solution onto a solid substrate with water vapor used as casts to obtain a thin film of a honeycomb structure having an orderly micro-pattern, and sectioning the thin film by peeling in its thickness direction thereby obtaining thin-film micro-pillar structures with micro-pillars regularly arranged and formed on the sectioned thin-film sections. This novel material, because of having striking surface properties due to micro-pillars regularly arranged on its surface, could hereafter find applications, with a great deal of advantages, in the following various fields: as chemical valves, DNA chips, protein chips and cyto-diagnosis chips, for cell culture engineering, as medical scaffolding materials, semiconductors, recording materials, separators, ion exchange membranes, battery separator materials, optical materials for displays and light guides, catalyst carriers, cell culture substrates and anisotropic solid, electrically conductive materials, for micro-passageways, etc. Further, the material of the invention could provide, with a good deal of advantages, a surface well suitable as a biochip surface for controlling material flows in a constant direction and a low friction resistance surface for diminishing air or water resistance in a certain direction alone. However, such advantages are nothing more than exemplification; the micro-pillar structure of the material of the invention could contribute much to accelerated contact effects or operations for separation of liquids by evaporation and drying in various reaction operations by gas-liquid contact reactions or liquid-liquid contact reactions.

The material of the invention also could possibly be used for specific flow passages, for instance, because pores formed on its surface cooperate with micro-pillars connected thereto to cause a liquid flowing on the surface that faces away the micro-pillars to be discharged to an external space through the combined pores and micro-pillars. That is, the material of the invention could be used not only as a medical material used for designing artificial blood vessels, artificial kidneys, etc., but also as kinetic materials for microrobots, micro-biorobots or the like, because the micro-pillars can be controlled to put them in any desired artificial ciliary movement. Further, the material of the invention could possibly be used for designing filters with reduced pressure losses, because the above arrangement enables liquids to be effectively discharged out of filter operations. Furthermore, the novel material of the invention, because of its free-form feature, could be used in various forms as well as in various applications. Thus, the material of the invention could hereafter be applied and used as a new material in microtechnology that will be ever more advanced with progresses in nanotechnology, with a great deal of advantages resulting from the specificity of the surface shape.

In particular, the aforesaid micro-pillar structure having a hydrophobic surface would be much more often used in technical fields where water repellent surfaces are now in stronger need than ever before. Such trends and applications are reviewed in a number of publications, and numerous aspects of various applications are reviewed and and mentioned there (for example, 1. "State-of-the-art trends in high water-repellency technology—from ultra-water repellent materials to the latest applications", Toray Research Center, 2001, and 2. "Material Integration", Vol. 14, No. 10, 2001). Still, with all processing methods so far available in the art, there are some limits to the materials to be processed, and much time and added costs are taken for processing steps. Aspect (2) of the invention and its related sub-aspects can provide a new material enough to meet such needs by a simple forming means. From now on, the material of the invention is expected to enjoy wide uses in diverse fields and make a great contribution to developments.

In some fields where the aforesaid water repellency is needed, there is an increasing need for an affinity for water. For designing filters for filtering purposes, for instance, it is required to improve the efficiency of separation of water from the surface of a filter material and, hence, keep the material hydrophilic. Aspect (3) of the invention and its related sub-aspects concerning the hydrophilic surface can provide a new material that has a surface rich in hydrophilicity so as to meet that.

BEST MODE OF CARRYING OUT THE INVENTION

As already explained, the micro-pillar structure of the invention is prepared through two steps, one for obtaining a porous honeycomb structure and another for sectioning it off by peeling. Such a series of operations will now be summarized below.

At the first step, a solution of a hydrophobic or biodegradable polymer and an amphiphilic polymer dissolved in a hydrophobic organic solvent is provided, and then cast on a substrate. Subsequently, the organic solvent is slowly evaporated in an air having a relative humidity of 50% or higher or, alternatively, it is evaporated by blowing a high-humidity atmospheric gas to the surface of the cast solution, so that moisture is condensed on the surface of the cast solution by the latent heat of evaporation into micro-droplets that are dispersed on the surface of the solution or in the solution into a close-packed structure. Finally, the micro-droplets, condensed and dispersed on the surface of the solution or in the solution, are evaporated to obtain a porous honeycomb structure with the droplets used as templates. At the second step, an adhesive tape is applied over the resulting honeycomb structure, and then peeled off by pulling or other peeling means to bisect the honeycomb structure, thereby obtaining structures wherein micro-pillars formed by fracturing of the honeycomb structure are regularly arranged on the bisected sections.

More specifically, in the process of obtaining the porous honeycomb structure with the droplets used as templates at the first step, the moisture is condensed on the surface of the cast solution into micro-droplets dispersed on the surface of the cast solution or in the cast solution into a close-packed structure, and the droplets are then evaporated to obtain a structure with closely packed micropores of 0.1 to 100 µm in diameter, i.e., a thin-film form of honeycomb structure. As previously described, that process itself has been proposed on the basis of a specific polymer, and filed in the form of a patent application. However, it has now been found that the honeycomb structure (FIG. 1) formed by the above process has a structure wherein, with the micro-droplets used as casts, one pore is supported by six posts that are constricted in the middle (FIG. 2); such findings underlie the invention.

That is, the porous honeycomb structure is sectioned off by peeling, thereby obtaining a state or structure wherein micro-pillars are quite regularly arranged and formed on the surfaces sectioned by peeling.

In the invention, the first process is linked to the second process wherein the honeycomb structure is broken away by peeling operation, thereby obtaining a texture with micro-pillars of given length formed at a given spacing.

Figure 1:
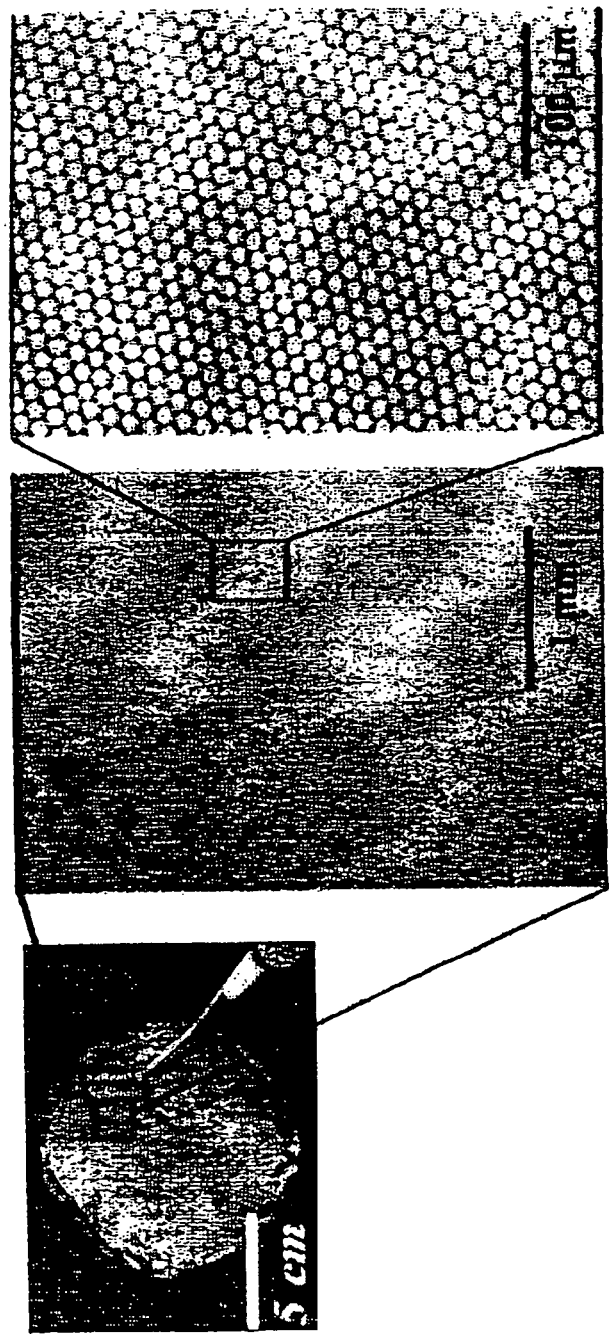
FIG. 1 is illustrative of an SEM image of the porous honeycomb structure (film) obtained on a laboratory dish as described in Example 1, and an SEM image of its surface.
Figure 2:
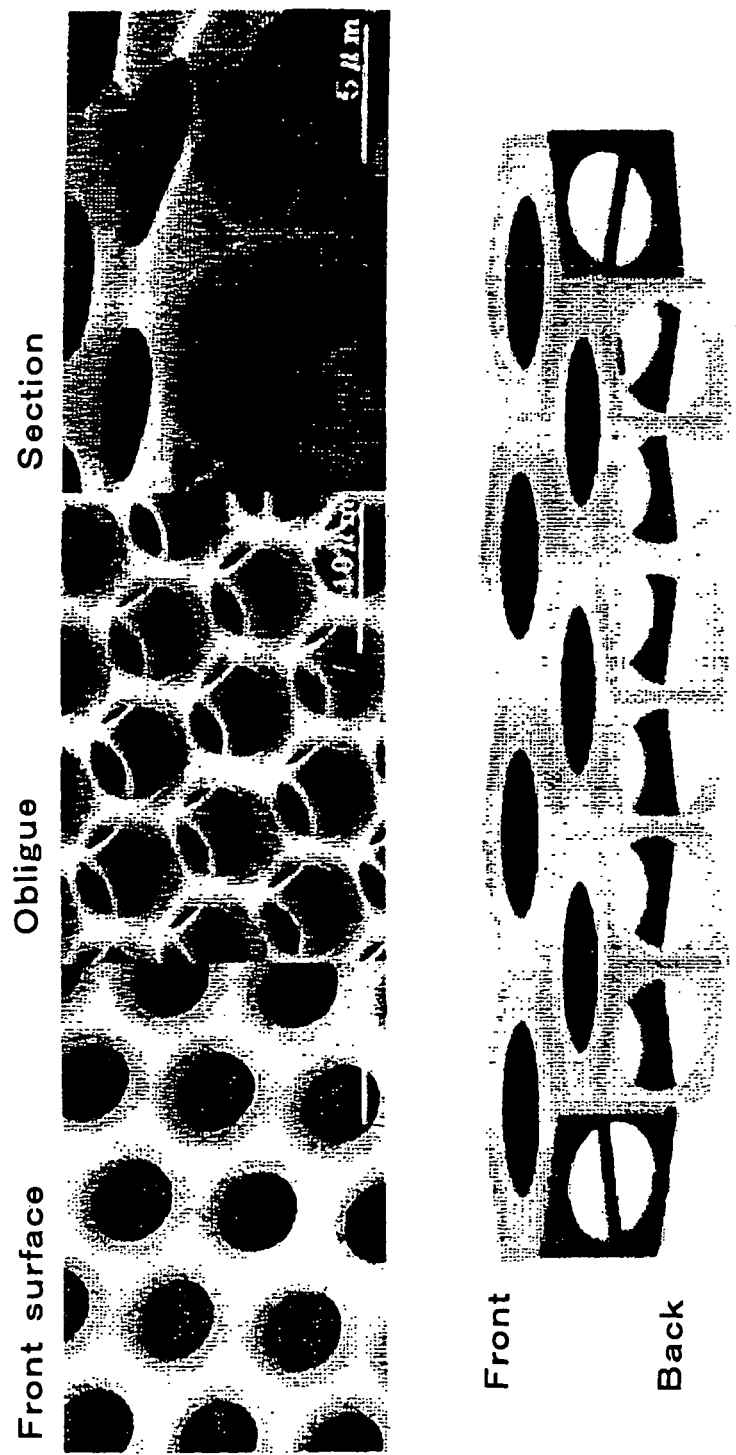
FIG. 2 is illustrative of an SEM image (top) of the porous honeycomb structure described in Example 1, and an SEM image (bottom) of its three-dimensional structure.

It is here noted that FIG. 1 is illustrative of a porous honeycomb structure, as formed in a laboratory dish and as scaled up to two scales, and FIG. 2 is illustrative of an image thereof further scaled up by an electron microscope (SEM), and illustrates in schematic a three-dimension texture thereof.

For the hydrophobic or biodegradable polymer employed herein, for instance, it is preferable in view of solubility in the organic solvent to use polylactic acid; lactic acid-glycolic acid copolymers; polyhydroxybutryic acid, polycaprolactone; biodegradable aliphatic polyesters such as polyethylene adipate and polybutylene adipate; aliphatic polycarbonates such as polybutylene carbonate and polyethylene carbonate; polystyrenes; polysulfones; polymethylhexadecylsiloxanes; polyvinylcarbazoles; poly-tetrahydrofulfuryl methacrylates; polybutyl methacrylates; polymethyl methacrylates; and polycarbonates.

For the amphiphilic polymer employed herein on which no particular limitation is placed, it is preferable to use amphiphilic polymers having a polyethylene glycol-polypropylene glycol block copolymer or an acrylamide polymer as a main chain skeleton and containing a dodecyl group as a hydrophobic side chain and a lactose or carboxyl group as a hydrophilic side chain, or amphiphilic polymers having as a hydrophilic group a water-soluble protein, for instance, an ion complex of an anionic polymer such as heparin or nucleic acids, e.g., dextran sulfate DNA or RNA with a long-chain alkyl ammonium salt, gelatin, collagen, and albumin, because they are easily available.

For preparing the porous-honeycomb-structure thin film that provides the micro-pillar structure of the invention, it is imperative to form micro-droplets on the polymer solution, and so the organic solvent used must be a water-insolbule one. It is also necessary that each polymer used be soluble in the organic solvent. Yet another requirement for the organic solvent is that it evaporates off readily, and causes moisture to condense readily by the latent heat of evaporation.

While the organic solvent is not particularly limited insofar as it possesses such properties, it is understood that it is desired to use easily available, toxicity-free organic solvents. Specific mention is made of, for instance, halogen-based organic solvents such as chloroform, dichloromethane and dichloroethane; aromatic hydrocarbons such as benzene, toluene and xylene; esters such as ethyl acetate and butyl acetate; water-insoluble ketones such as methyl isobutyl ketone; and carbon disulfide. Those organic solvents may be used alone or in the form of a mixed solvent comprising a combination of two or more.

The combined concentration of both the hydrophobic or biodegradable polymer and the amphiphilic polymer, all soluble in the organic solvent(s), is in the range of preferably 0.01 to 20 wt %, and more preferably 0.1 to 10 wt %. Polymer concentrations of lower than 0.01 wt % are not desired because the ensuing thin film has insufficient dynamic strength. Too high polymer concentrations of more than 20 wt % fail to give any good enough honeycomb structure. The composition ratio of the hydrophobic or biodegradable polymer to the amphiphilic polymer should be in the range of 99:1 to 50:50 (wt/wt). The amphiphilic polymer ratios of less than 1 and more than 50 are not preferable because in the former case no uniform porous structure is obtainable and in the latter case the resulting porous thin film lacks stability, especially dynamic stability.

In the invention, the solution of those polymers in the organic solvent is cast on the substrate to prepare a porous thin film. For that substrate, it is preferable to avoid use of substrate materials that are mutually dissoluble in the solution of the polymers dissolved in the organic solvent or undergo corrosion and reaction therewith or rely on chemically stable substrate materials. For instance, mention is made of inorganic materials such as glasses, metals and silicon wafers; and polymers excellent in resistance to organic solvents, such as polypropylene, polyethylene, polyether ketone and fluororesin. While all the above substrate materials have a solid surface, it is understood that the invention is not always limited to them. In other words, it is acceptable to make use of liquids such as water, liquid paraffin and liquid polyether. After the starting polymer solution is spread on that liquid, similar operation is carried out or, specifically, the organic solvent is evaporated in a high-humidity atmosphere to obtain a thin film having a porous honeycomb structure with droplets used as casts. Thereafter, similar peeling operation is performed to form micro-pillars. Use of the liquid for the substrate is rather preferable to prepare thinner films because the thickness of the polymer solution spread on the substrate can be controlled by surface tension.

The structure can be easily removed by itself from any of the substrates while taking advantage of the feature, i.e., self-supportability, of the thin film of the porous honeycomb structure.

In the invention, a possible mechanism of forming the porous honeycomb structure could be as follows. As the hydrophobic organic solvent is evaporated, it gets rid of latent heat, lowering the temperature of the surface of the cast thin film to condense moisture, thereby aggregating and depositing micro-droplets of water on the surface of the polymer solution. The hydrophilic moiety in the polymer solution then works to decrease the surface tension between water and the hydrophobic organic solvent, so that micro-particles of water can be stabilized against coming together into an aggregate. As the solvent is further evaporated, it allows hexagonal droplets to be arranged in close-packed form and, eventually, as the water is evaporated off, it allows the polymer to be used as arranged in orderly honeycomb form. Therefore, the environment in which the thin film is to be prepared should preferably have a relative humidity in the range of 50 to 95%. A relative humidity of less than 50% is not preferable because the condensation of water on the cast thin film becomes insufficient, and a relative humidity of more than 95% is again not preferable because environment control becomes difficult.

As can be appreciated from the foregoing, the "porous honeycomb structure" of the invention has a double-layer texture in which two films are put one upon another (see FIG. 2) with micropores regularly arranged between them, wherein each micropore is supported by six posts that are constricted in the middle. A possible reason for the formation of such a complicated and orderly texture could be that atmospheric moisture is condensed by the latent heat of evaporation of the solvent on the surface of the cast polymer solution and water droplets are hexagonally close-packed, causing the polymer to be precipitated in a space except for the water droplets.

The pore diameter and thickness of the porous thin film may be controlled by varying the concentration of the solution to be cast, the type of the solvent, the amount of the solution, the prevailing atmosphere or the flow rate, temperature and humidity of the air to be blown, i.e., controlling the evaporation speed of the solvent and the condensation speed in a suitable combination, whereby the growth of water droplets that provide the casts for pore diameter and the evaporation rate of the solvent are controllable. The pore diameter and thickness of the thus obtained porous thin film that is the precursor of the micro-pillar structure are in the range of 0.1 to 100 µm.

The high-humidity air to be blown onto the film may have a relative humidity such that atmospheric moisture can be condensed on the surface of the film, i.e., a relative humidity of 20 to 100% although it varies with temperature. In the invention, not only is air usable but relatively inert gases such as nitrogen and argon may be used as well.

The flow rate of the high-humidity air to be blown onto the film may be such that the atmospheric air is condensed on the surface of the film and the solvent used for casting is evaporated.

The temperature of the atmosphere for blowing the high-humidity air may be such that the solvent used for casting is evaporated.

By way of illustration but not by way of limitation, the peeling operation for the surface of the porous thin film is typically carried out by means of peeling off an adhesive tape applied over the surface of the thin film. The peeling operation by the adhesive tape is capable of forming a micro-pillar structure even on a curved substrate, because a similar micro-pillar structure can be formed on either a substrate side or a tape side. Some other peeling operations are also usable, including ultrasonic irradiation, or dissolution of polymer. It is here noted that the micro-pillar structure formed on the substrate side can be easily peeled off as a self-supporting thin film.

The porous-honeycomb-structure thin film provides the precursor of the micro-pillar structure, and so the spacing between the micro-pillars is in the range of about 0.1 to 100 µm depending on the pore diameter of the porous thin film. The height and tip size of the micro-pillar structure are in the ranges of about 0.1 to 100 µm and 0.01 to 20 µm, respectively, depending on the thickness of the porous thin film, the peeling operation applied and the material used.

It is here noted that the "micro-pillar structure" used herein refers to a structure in which a plurality of pillars of substantially constant height are regularly arranged at a substantially constant spacing. Sectional shape of each pillar is not exclusively any of circular, oval, hexagonal, rectangular, square or other shapes.

The micro-pillar structure of the invention, because of having micro-pillars formed thereon, has much better properties than structures free from micro-pillars or having irregular micro-pillars, such as decreased surface resistance and much improved water repellency. To add to this, the micro-pillar structure of the invention could have applications as a culture substrate in cell culture technology to improve the rate of deposition of cells, producing excellent actions on cell growth and differentiation, etc. As a matter of course, the micro-pillar structure of the invention is quite an unheard-of material in view of not only its surface properties but also its generally unique micro-texture, and so is of great significance. The inventors make sure that novel structure could hereafter have great impacts on material designing in various fields, and give rise to far better advantages contributing much to developments in the industry.

EXAMPLES

The present invention is now explained with reference to the drawings and examples. However, the examples are given as an aid to a better understanding of the invention and the invention is not limited thereto whatsoever.

Example 1

Figure 3:
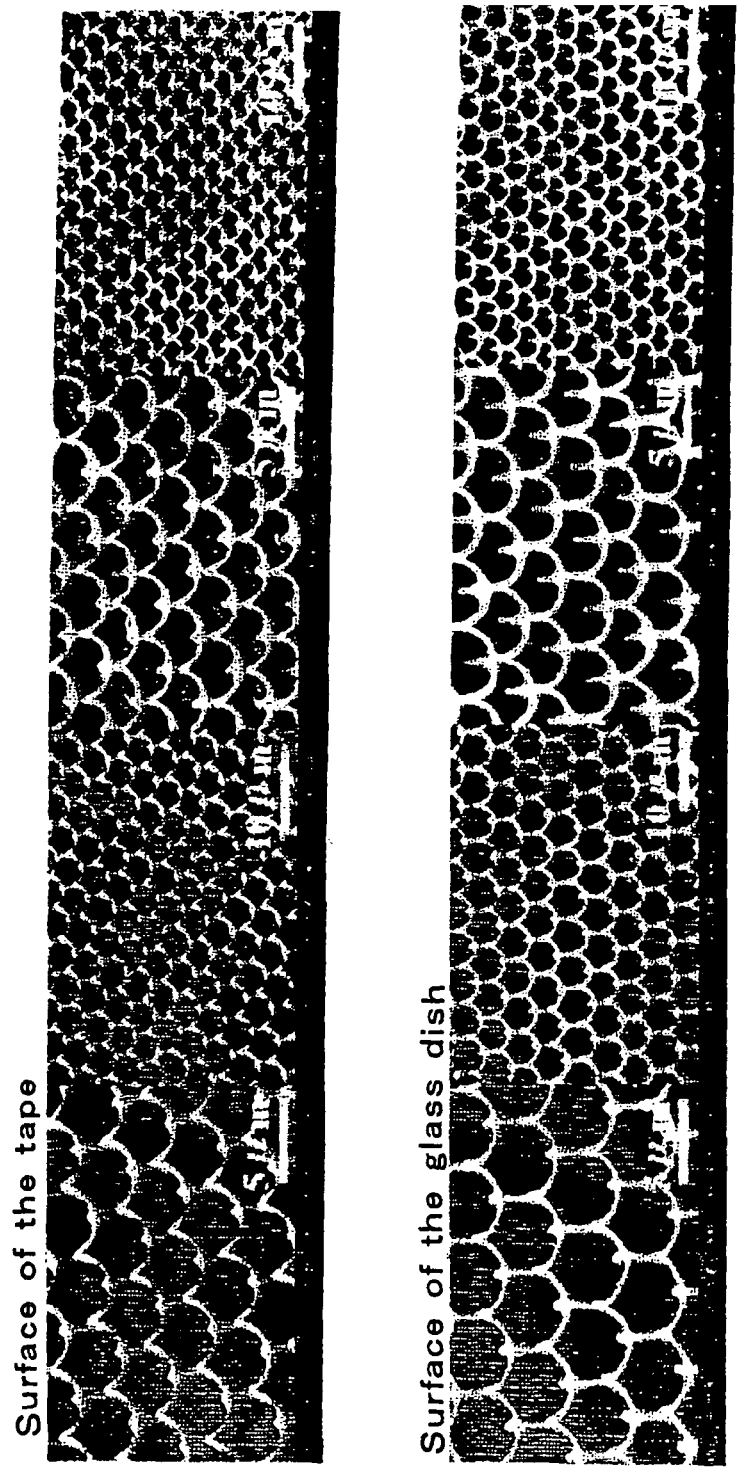
FIG. 3 is illustrative of an SEM image of the micro-pillar structure of Example 1 obtained after sectioning by peeling, as taken from an oblique direction.

Four (4) ml of a chloroform solution (having a polymer concentration of 4 mg/l) in which a polystyrene having an average molecular weight of 200,000 was mixed with an amphiphilic polyacrylamide (compound 1Cap formally called dodecylacrylamide-ω-carboxyhexylacrylamide) at a weight ratio of 10:1 were cast on a glass laboratory dish of 10 cm in diameter, and the chloroform solvent was evaporated with a high-humidity air having a relative humidity of 70% blown onto the solution in a flow rate of 2 l per minute to prepare a porous thin film having a honeycomb pattern structure (FIGS. 1 and 2). An adhesive tape was then applied over the surface of a film-like sample piece obtained in the laboratory dish, after which the tape was peeled off in a thickness direction to prepare a micro-pillar structure. Oblique observation under an electron microscope (hereinafter called SEM for short) indicated that structures with micro-pillars, having quite high regularity, could be obtained on both a tape side and a glass laboratory dish side (FIG. 3).

Structural Formula of Cap

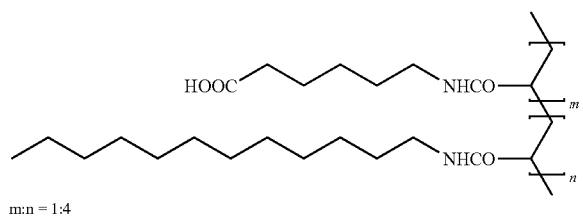

m:n = 1:4

Example 2

Figure 4:
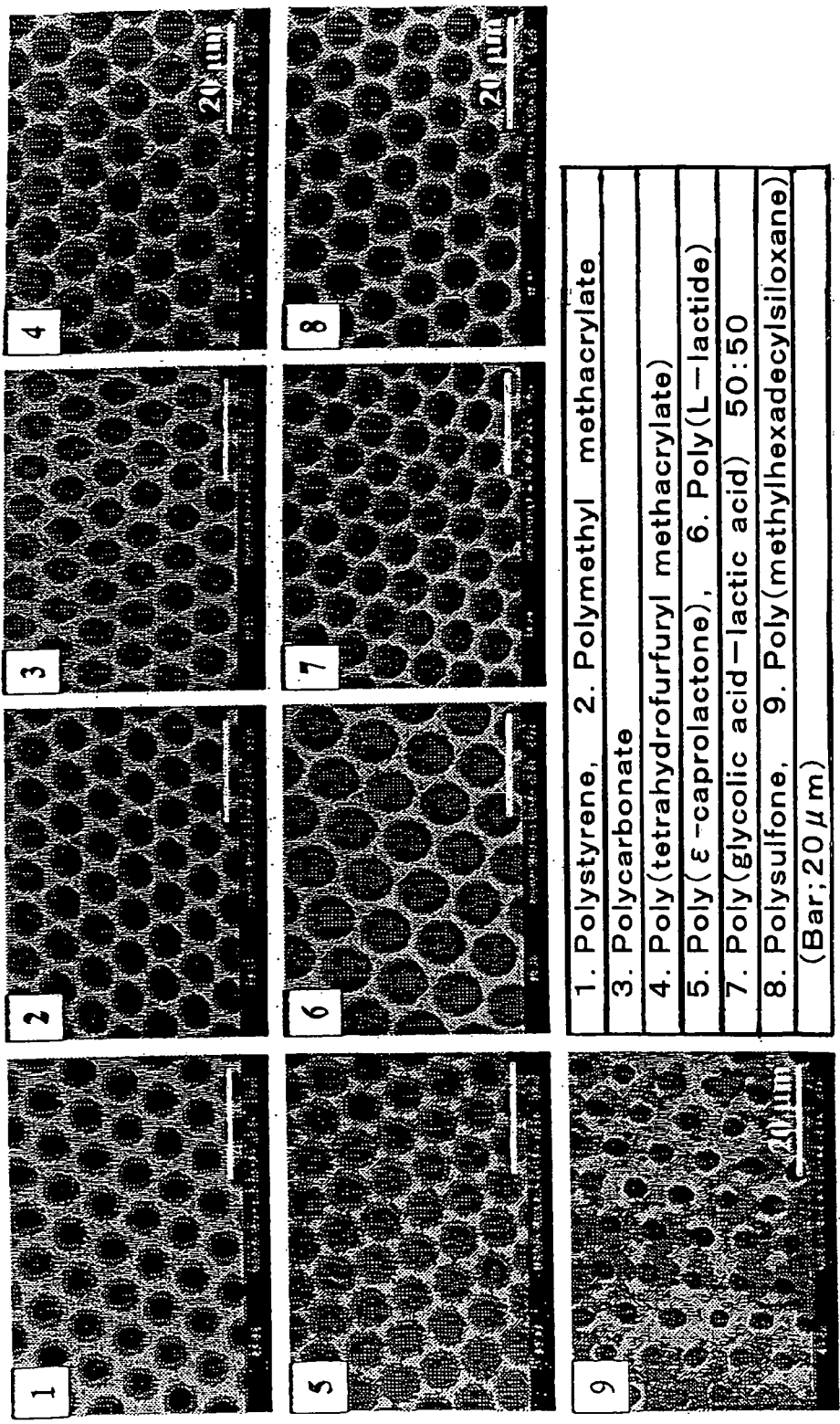
FIG. 4 is illustrative of SEM images of the porous honeycomb structures (films) made of various polymers set forth in Example 2.
Figure 5:
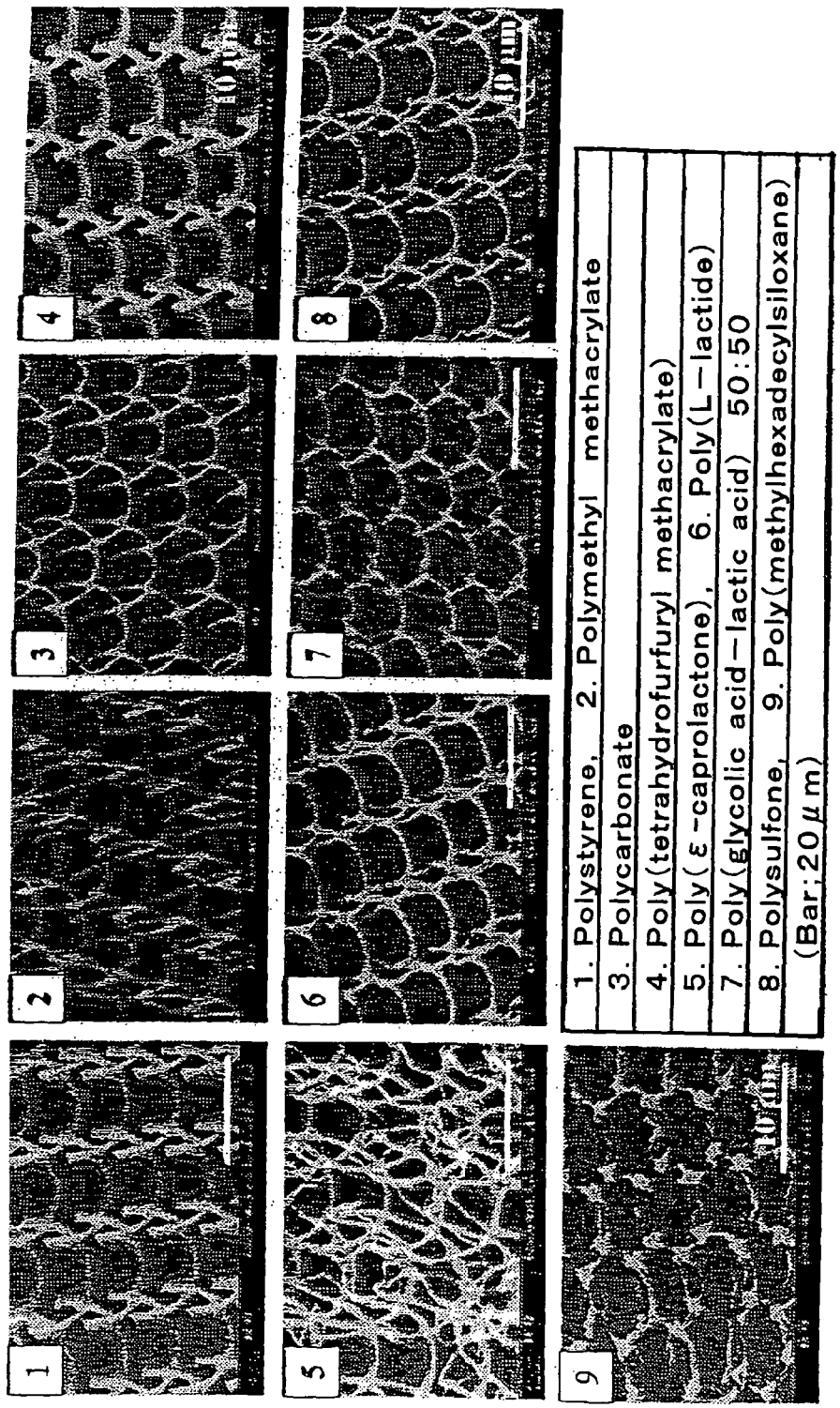
FIG. 5 is illustrative of SEM images of the micro-pillar structures that were prepared by peeling tapes off the porous honeycomb structures (films) of Example 2.

Six (6) ml of each of chloroform solutions (having a polymer concentration of 4 mg/l) in which nine polymers, i.e., 1. polystyrene, 2. polymethyl methacrylate, 3. polycarbonate, 4. polytetrahydrofurfuryl methacrylate, 5. poly(∈-caprolactone), 6. polylactic acid, 7. poly(glycolic acid-lactic acid) copolymer (having a composition rate of 50:50), 8. polysulfone, and 9. polymethylhexadecylsiloxane were each mixed with an amphiphilic polyacrylamide (compound 1Cap: dodecylacrylamide-ω-carboxyhexyl-acrylamide) at a weight ratio of 10:1 were cast on a glass laboratory dish of 10 cm in diameter, and the chloroform solvent was evaporated with a high-humidity air having a relative humidity of 70% blown onto the solution in a flow rate of 3 l per minute to prepare a porous thin film having a honeycomb pattern structure in which ultramicro-pores all lined up regularly (FIG. 4). As a result of similar peeling operation as in Example 1, a micro-pillar structure could be prepared, in which posts lined up regularly about each micropore to support it ruptured so that ultramicro-pillars lined up regularly (FIG. 5).

Example 3

Figure 6:
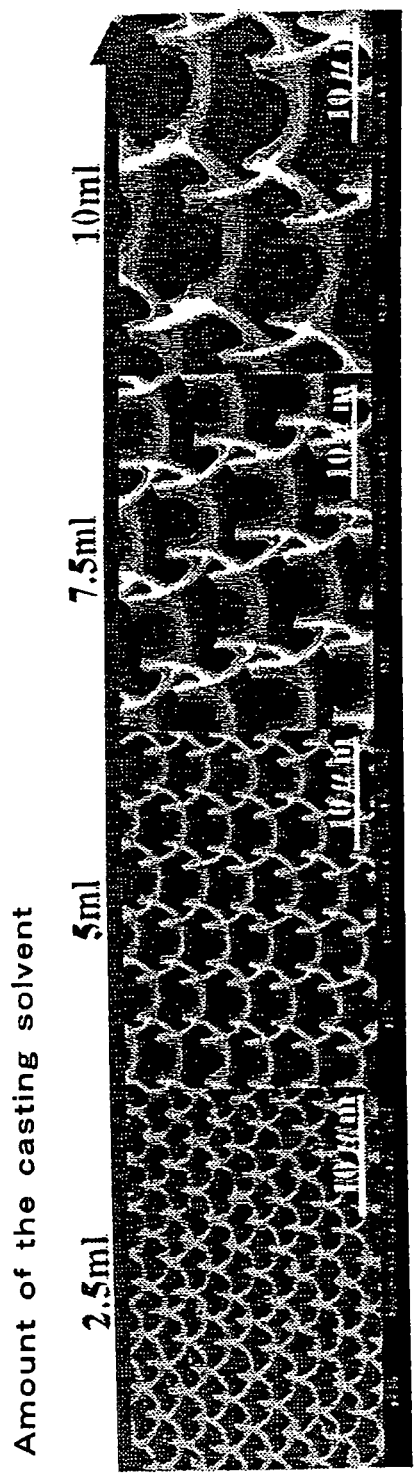
FIG. 6 is illustrative of an SEM image of the micro-pillar structure of Example 3.
Figure 6:
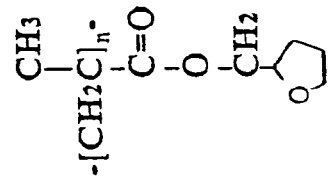

A chloroform solution (having a polymer concentration of 4 mg/l) in which a polytetrahydrofurfuryl methacrylate having an average molecular weight of 200,000 was mixed with an amphiphilic polyacrylamide at a weight ratio of 10:1 were cast in varied amounts of 2.5, 5, 7.5 and 10 ml on a glass laboratory dish of 10 cm in diameter, and the chloroform solvent was evaporated with a high-humidity air having a relative humidity of 70% blown onto the solution in a flow rate of 2 l per minute to prepare a porous thin film having a honeycomb pattern structure. An adhesive tape was then applied over the surface of the film, after which the tape was peeled off in a thickness direction to prepare a micro-pillar structure. SEM observations indicated that structures with micro-pillars having a varying pillar spacing could be prepared depending on the amount of the solvent cast (FIG. 6).

Example 4

Figure 7:
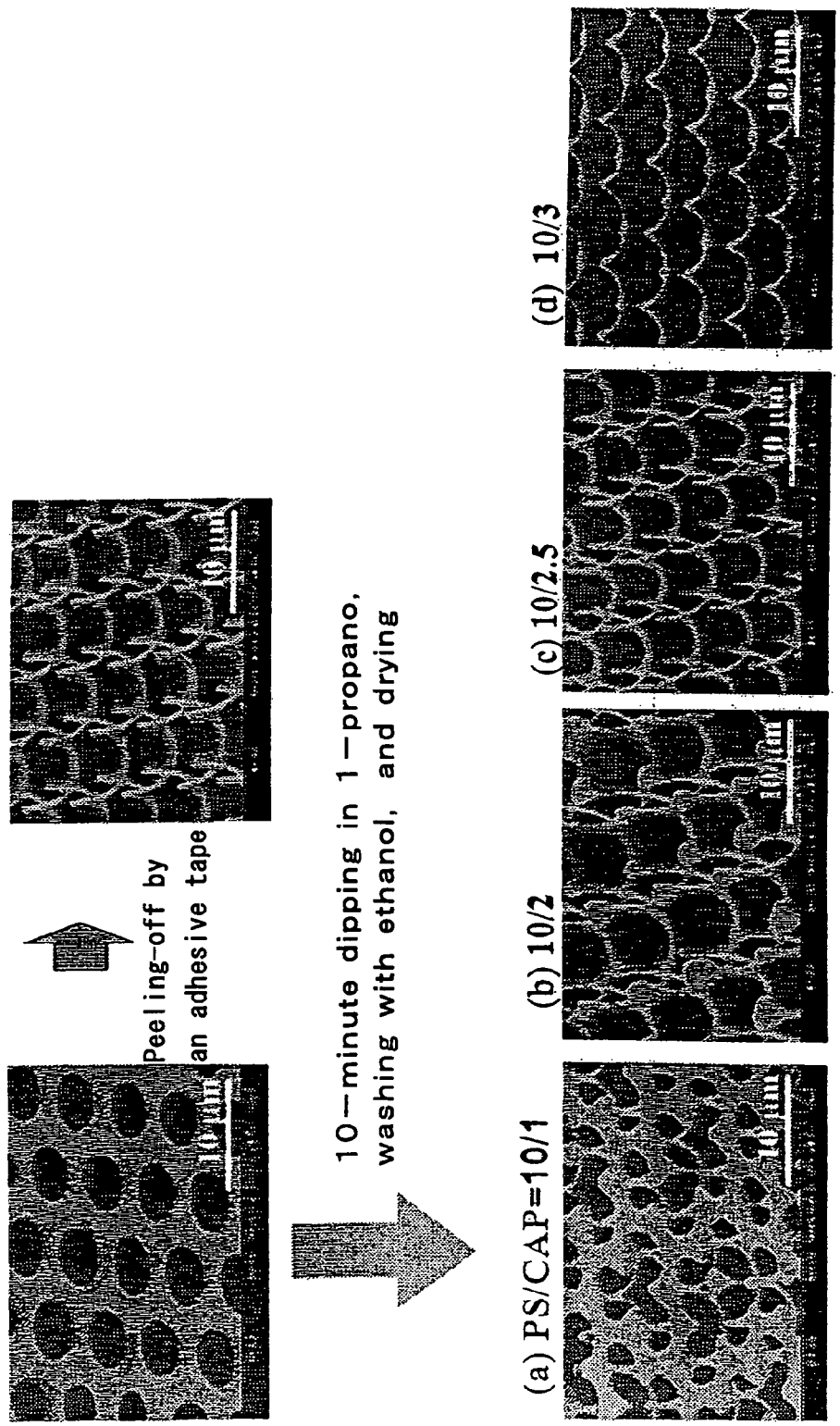
FIG. 7 is illustrative of SEM images of the micro-pillar structures obtained by the dissolution of the polymer in Example 4.

Eight (8) ml of chloroform solution (having a polymer concentration of 4 mg/l) in which a polystyrene was mixed with an amphiphilic polyacrylamide (compound 1Cap: dodecylacrylamide-ω-carboxyhexylacrylamide) at weight ratios of (a) 10:1, (b) 10:2, (c) 10:2.5 and (d) 10:3 were cast on a glass laboratory dish of 10 cm in diameter, and the chloroform solvent was evaporated with a high-humidity air having a relative humidity of 70% blown onto the solution in a flow rate of 3 l per minute to prepare porous thin films having a honeycomb pattern. Each porous thin film was dissolved in 1-propanol by a 10-minute dipping, followed by washing with ethanol. After drying, SEM observations (FIG. 7) were performed. As a result, it was found that each sample piece could be sectioned off by peeling, yielding a structure in which micro-pillars or micro-pillar patterns lined up regularly oh the sectioned surfaces. For the purpose of comparison, a structure obtained by tape peeling operation was shown on the right side. As a result, it was found that the dissolution-of-the-polymer operation, too, was an effective peeling means.

Example 5

Figure 8:
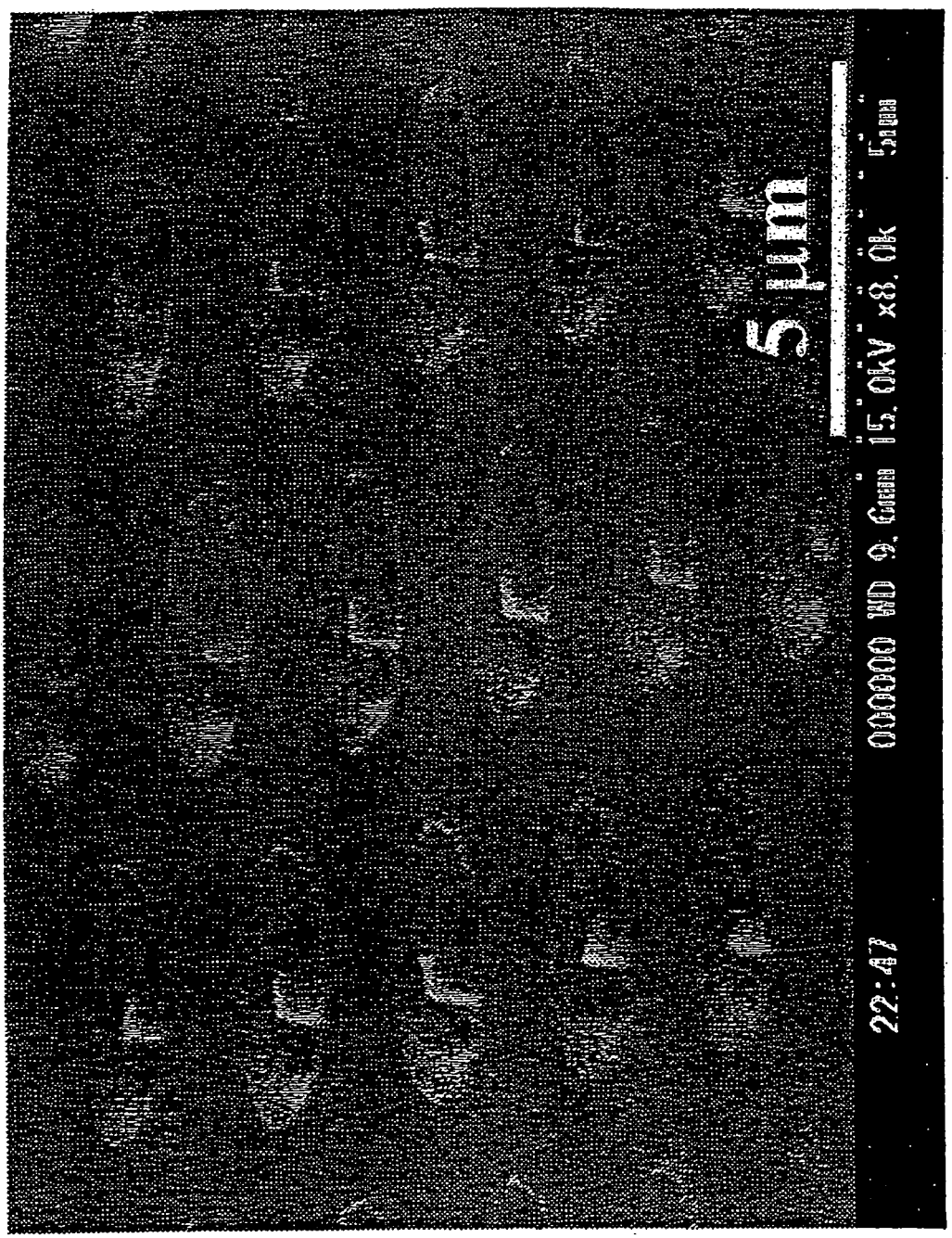
FIG. 8 is illustrative of an SEM image of the micro-pillar structure obtained by ultrasonic irradiation in Example 5.

Five (5) ml of a chloroform solution (having a polymer concentration of 4 mg/l) in which a polystyrene was mixed with an amphiphilic polyacrylamide (compound 1Cap: dodecylacrylamide-ω-carboxyhexylacrylamide) at a weight ratio of 10:1 were cast on a glass laboratory dish of 10 cm in diameter, and the chloroform solvent was evaporated with a high-humidity air having a relative humidity of 70% blown onto the solution in a flow rate of 3 l per minute to prepare a porous thin film having a honeycomb pattern. The thus obtained porous thin film was irradiated with ultrasonic waves (20 KHz, 15 W) for 5 minutes. As a result, it was shown that the honeycomb structure formed with the water droplets used as casts was cut at posts and micro-pillars were popped out. Through SEM observations, ultrasonic irradiation was shown to be an effective peeling means (FIG. 8).

Example 6

Figure 9:
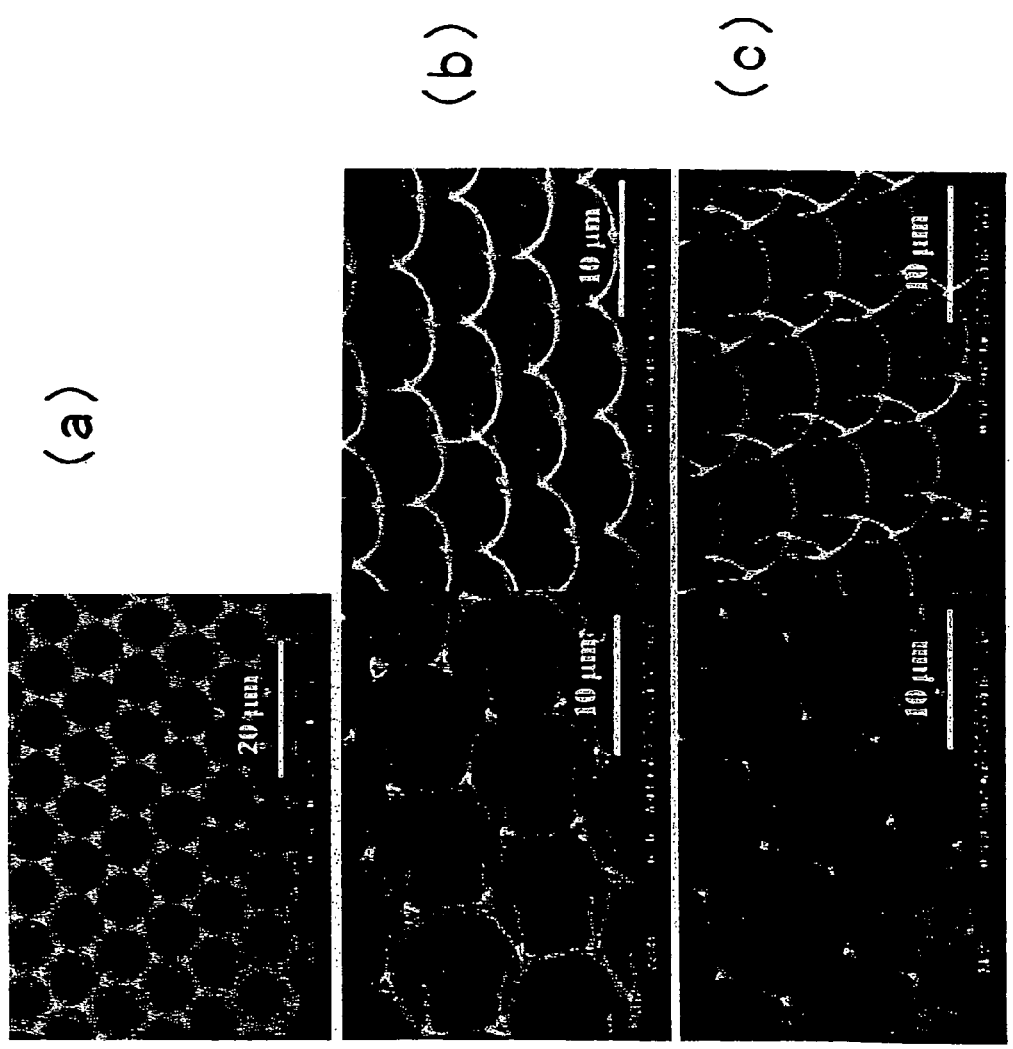
FIG. 9 is illustrative of SEM images of the anisotropic micro-pillar structure of Example 6.

Eight (8) ml of a chloroform solution (having a polymer concentration of 4 mg/l) in which a polycarbonate having an average molecular weight of 29,000 was mixed with an amphiphilic polyacrylamide (compound 1Cap formally called dodecylacrylamide-ω-carboxyhexylacrylamide) at a weight ratio of 10:1 were cast on a glass laboratory dish of 10 cm in diameter, and the chloroform solvent was evaporated with a high-humidity air having a relative humidity of 70% blown onto the solution in a flow rate of 2 l per minute to prepare a porous thin film having a honeycomb pattern (FIG. 9(*a*)). An adhesive tape was then applied over the surface of the film, after which the adhesive tape was peeled off with the application of transverse shearing stress to prepare anisotropic micro-pillar structures (FIGS. 9(*b*) and 9(*c*)). As a result of SEM oblique observations, it was found that anisotropic micro-pillar structures having quite high regularity could be obtained on both a tape side and a glass laboratory dish.

Example 7

Figure 10:
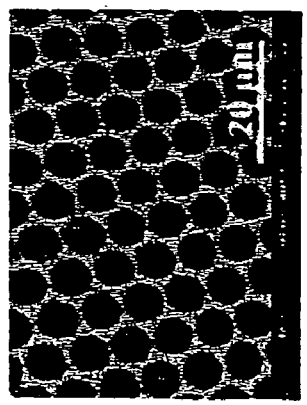
FIG. 10(a) is illustrative of an SEM image of the anisotropic micro-pillar structure of Example 7, as taken from right above.
FIGS. 10(b) and 10(c) are illustrative of its SEM images as taken from a 55° oblique direction.
Figure 10:
Figure 10:
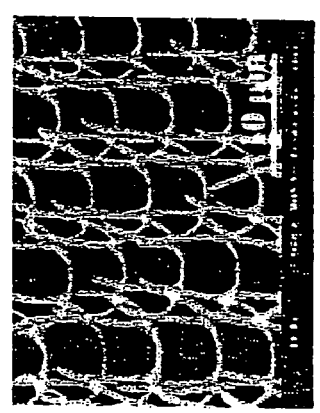

Six (6) ml of a chloroform solution (having a polymer concentration of 4 mg/l) in which a polystyrene having an average molecular weight of 1,000,000 was mixed with an amphiphilic polyacrylamide at a weight ratio of 10:1 were cast on a glass laboratory dish of 10 cm in diameter, and the chloroform solvent was evaporated with a high-humidity air having a relative humidity of 70% blown onto the solution in a flow rate of 3 l per minute to prepare a porous thin film having a honeycomb pattern (FIG. 10(*a*)). An adhesive tape was then applied over the surface of the film, after which the adhesive tape was peeled off with the application of transverse shearing stress to prepare anisotropic micro-pillar structures (FIGS. 10(*b*) and 10(*c*)). As a result of SEM oblique observations, it was found that anisotropic micro-pillar structures having quite high regularity could be obtained on both a tape side and a glass laboratory dish.

Examples 8 to 13 are now given to show that the inventive micro-pillar structure, prepared from the hydrophobic polymer, has a water-repellent surface as compared with an ordinary film structure (hereinafter called a plain film) or a honeycomb structure with no micro-pillars, prepared from the same material.

Example 8 and Comparative Examples 1, 2

Six (6) ml of a chloroform solution (having a polymer concentration of 4 mg/l) in which a polystyrene having an average molecular weight of 200,000 (Aldrich) was mixed with an amphiphilic polyacrylamide (compound 1Cap: dodecylacrylamide-ω-carboxyhexylacrylamide) at a weight ratio of 10:1 were cast on a glass laboratory dish of 10 cm in diameter, and the chloroform solvent was evaporated with a high-humidity air having a relative humidity of 80% blown onto the solution in a flow rate of 3 l per minute to prepare a porous thin film having a honeycomb pattern. An adhesive tape was then applied over the surface of the film, after which the adhesive tape was peeled off to prepare anisotropic micro-pillar structures. Ten (10) μl of distilled water were added drop-wise onto each micro-pillar structure, and in 30 seconds later, the static contact angle with water was measured. For the purpose of comparison and control, the static contact angles with water of the surface of a polystyrene porous film and a plain film prepared using a chloroform solution of the above polystyrene and Cap (at a weight ratio of 10:1) with a spin coater were measured. The static contact angles with water, as measured, are set out in Table 1.

Example 9 and Comparative Examples 3, 4

Example 1 was repeated using a polymethyl methacrylate having an average molecular weight of 350,000 (Aldrich) instead of the polystyrene to prepare a porous thin film having a honeycomb pattern structure, a micro-pillar structure and a plain film, and their static contact angles with water were measured. The results are set out in Table 1.

Example 10(c) and Comparative Examples 5, 6

Example 1 was repeated using a polycarbonate having an average molecular weight of 29,000 instead of the polystyrene to prepare a porous thin film having a honeycomb pattern structure, a micro-pillar structure and a plain film, and their static contact angles with water were measured. The results are set out in Table 1.

Example 10(c) and Comparative Examples 5, 6

Example 1 was repeated using a polycarbonate having an average molecular weight of 29,000 instead of the polystyrene to prepare a porous thin film having a honeycomb pattern structure, a micro-pillar structure and a plain film, and their static contact angles with water were measured. The results are set out in Table 1.

Example 11 and Comparative Examples 7, 8

Example 1 was repeated using a polytetrahydro-furfuryl methacrylate having an average molecular weight of 240,000 instead of the polystyrene to prepare a porous thin film having a honeycomb pattern structure, a micro-pillar structure and a plain film, and their static contact angles with water were measured. The results are set out in Table 1.

Example 12(e) and Comparative Examples 9, 10

Example 1 was repeated using a poly(∈-caprolactone) having a viscosity-average molecular weight of 40,000 (made by Wako Junyaku Co., Ltd.) instead of the polystyrene to prepare a porous thin film having a honeycomb pattern structure, a micro-pillar structure and a plain film, and their static contact angles with water were measured. The results are set out in Table 1.

Example 13(f) and Comparative Examples 11, 12

Example 1 was repeated using a poly(glycolic acid-lactic acid) copolymer (available from Aldrich with a composition ratio of 50:50) having a weight-average molecular weight of 40,000 to 75,000) instead of the polystyrene to prepare a porous thin film having a honeycomb pattern structure, a micro-pillar structure and a plain film, and their static contact angles with water were measured. The results are set out in Table 1.

TABLE 1

| Inventive/ Comparative | Polymer | Comparative Contact Angle Plain | Comparative Contact Angle Honeycomb | Inventive Contact Angle Micro-Pillars |
|---|---|---|---|---|
| 1/(1, 2) | Polystyrene | 98° ± 3° | 120° ± 2° | 159° ± 3° |
| 2/(3, 4) | Polymethyl Methacrylate | 96° ± 3° | 120° ± 2° | 158° ± 4° |
| 3/(5, 6) | Polycarbonate | 97° ± 3° | 122° ± 3° | 162° ± 3° |
| 4/(7, 8) | Poly(tetrahydrofurfuryl-methacrylate) | 85° ± 3° | 121° ± 2° | 158° ± 2° |
| 5/(9, 10) | Poly (∈-caprolactone) | 80° ± 3° | 120° ± 2° | 151° ± 1° |
| 6/(11, 12) | Poly(glycolic acid-lactic acid) 50:50 | 91° ± 1° | 127° ± 3° | 164° ± 2° |

Example 14 is now given to show that a micro-pillar structure having good wettability by water and rich hydrophilicity can be prepared by the application of hydrophilicity-imparting means to the surfaces of micro-pillars comprising polymers.

Example 14

Surface Modification by Titanium Alkoxide

A polylactic acid (PLLA) and Cap were mixed together at a ratio of 1:1 to prepare 2.0 g/l of a chloroform solution. This solution was cast on a laboratory dish of 9 cm in diameter and a high-humidity air was blown to the solution to obtain a honeycomb film. An upper surface of the thus prepared film was peeled off with the use of an adhesive tape to prepare a pillar (protuberance) structure.

Ten (10) ml of MilliQ water were added dropwise to each sample and, in 30 seconds later and 210 seconds later, the contact angle was measured. For the purpose of control, similar experimentation was carried out using a plain film and a honeycomb pattern film, each of the same composition as mentioned above. By measurement, the contact angle with water was 101°±9° for a plain film sample, 109°±2° for a honeycomb sample, and 138°±2° for a pillar structure sample.

Each sample film was then immersed in a titanium alkoxide solution. The film became slightly cloudy, because of light scattering on the surface of the film on which titania gels having a high refractive index were formed by the hydrolysis of the titanium alkoxide. Even after rinsing, there was no change in the cloudy surface. In other words, the titania gels would have been fixed to the film surface. The Cap polymer that was the amphiphilic polymer had a carboxyl group that would worked as a scaffolding for growth of titania gels on the film surface.

When the titania gels were formed on the film surface, the contact angle in 30 seconds after dropwise addition of water droplets thereto was 39°±10° for a plain film sample, 19°±6° for a honeycomb sample, and 31°±10° for a pillar structure sample, indicating that the samples were made hydrophilic.

After the lapse of 210 seconds from the dropwise addition of water droplets, the contact angle became much smaller; that of the plain film sample decreased to 28°±6°, and those of the honeycomb and pillar structure samples decreased down to a level as small as could not detect any contact. The contact angle of the plain film was unlikely to become lower than a constant value, whereas the contact angle of the structured film became extraordinarily small, probably because the structured hydrophilic surface gave rise to capillary force that caused the liquid to spread gradually over the surface of the film.

Wenzel has reported that generally as a surface area becomes large (that is, a surface is provided with asperities), it works in such a way as to enhance the properties of the surface. An apparent contact angle $\theta_w$ is given by $$\cos \theta_w = r \cos \theta$$

Here r is the quotient of the area of a plain film divided by the surface area of a structured film, and θ is the contact angle of the plain film. In other words, the larger the surface area, the more enhanced the properties of the surface are. In this case, too, similar events appear to have occurred.

Example 15

Impartation of Hydrophilicity by Ozone Treatment

A polystyrene (having a molecular weight of 280,000, Aldrich) and Cap were mixed together at a ratio of 10:1 to prepare 5.0 g/l of a solution. This solution (7.5 ml) was cast on a laboratory dish of about 9 cm in diameter, and a high-humidity air was blown to the solution to prepare a film. Some upper surface of the film was peeled off with the use of an adhesive tape to prepare a pillar structure. Each of the obtained films was measured in terms of contact angle. At this time, the contact angles of the honeycomb and pillar structure films were 114°±2° and 158°±5°, respectively.

Then, the prepared film was treated by an ozone cleaner (NL-UV253 made by Nippon Laser Electronics Co., Ltd.), during which the contact angle on the film was measured every 30-minute ozone treatment. As a result, the contact angle was found to decrease slowly. However, the decrease in the contact angle of the honeycomb film was gentle; it kept a contact angle of about 70° even after a 180-minute treatment, whereas the pillar structure was more considerable than the honeycomb structure in terms of the decrease in the contact angle; the contact angle after the 180-minute treatment was about 30°. This would indicate that the effect of the surface shape is more enhanced by the ozone treatment.

Example 16

A honeycomb film prepared from a poly(glycolic acid-lactic acid) copolymer having a weight-average molecular weight of 40,000 to 75,000 (Aldrich) was sectioned off by peeling in a thickness direction with the use of a tape to prepare a pillar structure. The surfaces of the pillars were immersed in a 1N aqueous solution of sodium hydroxide for 120 minutes, followed by washing with distilled water. After drying, the static contact angle with water droplets was measured after the lapse of 30 seconds, and 120 seconds from the dropwise addition of water droplets. As a result, the film was found to have a contact angle of 164°±2° before the immersion, but the contact angle of the film after the immersion (30 seconds and 120 seconds) was 21°±5° and about 0°, respectively.

Example 17

For surface coating, the surface of the pillar structure prepared in Example 16 was immersed in a 0.2 w/v % methanol solution of a poly(2-methoxyethyl acrylate) that was a water-insoluble, hydrophilic polymer and had a weight-average molecular weight of 85,000. After drying, the static contact angle with water droplets was measured after the lapse of 30 seconds, and 120 seconds from the dropwise addition of water droplets. As a result, the film was found to have a contact angle of 164°±2° before the coating, but the contact angle of the film after the coating (30 seconds and 120 seconds) was 29°±4° and about 0°, respectively.

From the above results, it was found that the honeycomb and pillar structures can be made hydrophilic by surface chemical modification, and ozone oxidization. Such films are expected to have possible applications to matrix materials, separation films or the like.

POSSIBLE UTILIZATION OF THE INVENTION IN THE INDUSTRY

According to the specific features of the invention that a dilute polymer solution is cast on a solid substrate using water vapor as casts to obtain a thin film having a fine regular pattern of honeycomb structure and the thins film is bisected by peeling in a thickness direction, there can be provided quite an unheard-of material wherein micro-pillars are regularly lined up and formed on the peeled sections of the thin film. This novel material, because of having micro-pillars regularly lined up on its surface, could hereafter find applications, with a great deal of advantages, in the following various fields: as chemical valves, DNA chips, protein chips and cyto-diagnosis chips, for cell culture engineering, as medical scaffolding materials, semiconductors, recording materials, separators, ion exchange membranes, battery separator materials, optical materials for displays and light guides, catalyst carriers, cell culture substrates and anisotropic solid, electrically conductive materials, for micro-passageways, etc. In particular, the presence of micro-pillars makes it possible to provide a surface well fit for a biochip surface that controls material flows in a constant direction, a low-friction-coefficient surface that reduces the resistance of air or water in a constant direction alone or the like. Such embodiments, if anisotropy is imparted to micro-pillars to add further enhancements to their own advantages, could find wide applications in various fields and make a great deal of contribution to developments in the industry.

What is claimed is:

1. A process for preparing a micro-pillar structure, characterized in that a solution having a polymer dissolved in a hydrophobic organic solvent is cast on a substrate, said organic solvent is evaporated in a moist atmosphere of relative humidity of 50% or higher to condense moisture contained in an atmosphere prevailing on a surface of said cast solution into micro-droplets, said micro-droplets are dispersed on the surface of said cast solution or in said cast solution into a packed structure, said micro-droplets, condensed and dispersed on the surface of said cast solution or in said cast solution, are evaporated to obtain a porous honeycomb structure with said droplets used as casts, and said porous honeycomb structure is at least bisected by peeling in a thickness direction, thereby obtaining honeycomb structures wherein micro-pillars are regularly formed and arranged by said bisection on peeled sections, characterized in that said polymer is composed of a hydrophobic or biodegradable polymer and an amphipathic polymer and, optionally, a modifier is incorporated therein, and said hydrophobic polymer comprises a polymer having a polystyrene basic skeleton and said biodegradable polymer comprises a polymer having a poly(meth)acrylate basic skeleton.

2. A process for preparing a micro-pillar structure according to claim 1, wherein said polymer comprises 50 to 99% of said hydrophobic polymer or said biodegradable polymer with the rest being an amphiphilic polymer.

3. A process for preparing a micro-pillar structure according to claim 1, wherein said moist atmosphere is adjusted to a relative humidity of 50 to 95%.

4. A process for preparing a micro-pillar structure according to claim 1 or 3, characterized in that said atmosphere is an ordinary air atmosphere.

5. A process for preparing a micro-pillar structure according to claim 1, characterized in that operation for evaporation of said organic solvent in said moist atmosphere is carried out by blowing an atmosphere having a high humidity onto an evaporation interface of said organic solvent.

6. A process for preparing a micro-pillar structure according to claim 1, characterized in that peeling operation is carried out by use of an adhesive tape.

7. A process for preparing a micro-pillar structure according to any one of claims 1, 3, 5 and 6, characterized in that said micro-pillars are arranged at a length of 0.1 to 50 μm, a tip length of 0.01 to 20 μm and a spacing of 0.1 to 100 μm.

8. A process for preparing a micro-pillar structure according to any one of claims 1, 3, 5 and 6, above, wherein said micro-pillars are oriented in an direction except for a vertical direction and set with anisotropy.

9. A process for preparing a micro-pillar structure according to claim 8, characterized in that said anisotropic micro-pillars are obtained by a peeling treatment with transverse shearing stress in such a way that when the porous honeycomb structure that is a micro-pillar precursor is sectioned by peeling in the thickness direction, the resulting micro-pillars are oriented in any direction except for the vertical direction.

* * * * *